US010223402B1

(12) United States Patent
Vokaliga et al.

(10) Patent No.: US 10,223,402 B1
(45) Date of Patent: Mar. 5, 2019

(54) MULTI-SITE BLOCK LEVEL WRITE CONSISTENCY

(71) Applicant: EMC IP Holding Company LLC, Hopkinton, MA (US)

(72) Inventors: Deepak Vokaliga, Hopkinton, MA (US); Benjamin Yoder, Westborough, MA (US); George Quill, Rindge, NH (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 568 days.

(21) Appl. No.: 14/982,218

(22) Filed: Dec. 29, 2015

Related U.S. Application Data

(60) Provisional application No. 62/222,436, filed on Sep. 23, 2015.

(51) Int. Cl.
*G06F 17/30* (2006.01)
*H04L 29/08* (2006.01)
*G06F 11/14* (2006.01)

(52) U.S. Cl.
CPC .. *G06F 17/30371* (2013.01); *G06F 17/30575* (2013.01); *H04L 67/1097* (2013.01); *G06F 11/1402* (2013.01); *G06F 11/1446* (2013.01); *G06F 11/1448* (2013.01); *G06F 11/1451* (2013.01); *G06F 11/1458* (2013.01); *G06F 11/1469* (2013.01)

(58) Field of Classification Search
USPC ........................................................ 711/152
See application file for complete search history.

(56) References Cited

U.S. PATENT DOCUMENTS

| | | | | |
|---|---|---|---|---|
| 2009/0198849 | A1* | 8/2009 | Arimilli | G06F 9/526 710/200 |
| 2014/0122718 | A1* | 5/2014 | Thoppai | G06F 17/30171 709/225 |
| 2015/0169475 | A1* | 6/2015 | Brown | G06F 12/1466 711/163 |

* cited by examiner

Primary Examiner — Aleksandr Kerzhner
Assistant Examiner — Eddy Cheung
(74) Attorney, Agent, or Firm — Muirhead and Saturnelli, LLC

(57) ABSTRACT

Maintaining write consistency between at least two mirrored storage devices includes receiving a write request for a particular block, obtaining a reservation for the particular block, waiting for the particular block to become available in response to not being able to successfully obtain the reservation, writing the particular block in response to successfully obtaining the reservation, and writing the particular block at a remote one of the storage devices following writing the particular block at the particular one of the storage devices. If a retryable indicator is received, the system waits a predetermined amount of time and releases the reservation. The system responds with a success indicator when writing the particular block at a remote one of the storage devices succeeds and responds with a failure indicator when writing the particular block at a remote one of the storage devices fails and the retryable indicator is not received.

16 Claims, 15 Drawing Sheets

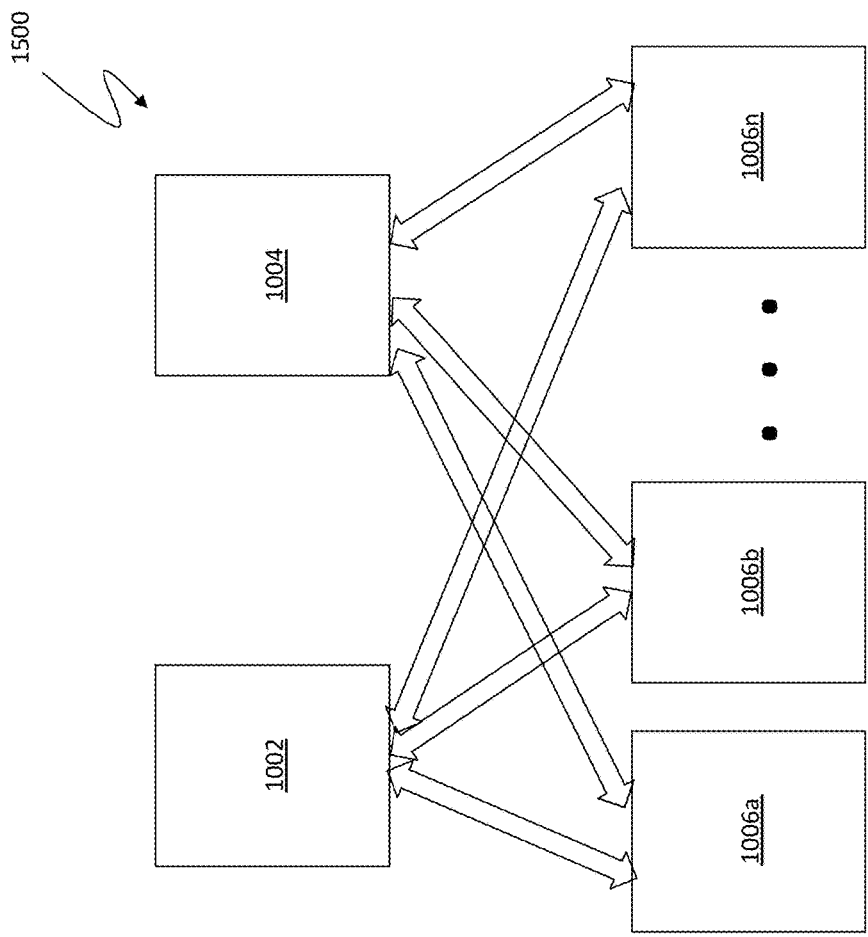

MULTI-SITE BLOCK LEVEL WRITE CONSISTENCY

CROSS-REFERENCE TO RELATED APPLICATIONS

This application claims priority to U.S. provisional patent application No. 62/222,436 titled "N HIGHLY AVAILABLE WITNESS FOR ACTIVE ACTIVE STORAGE CLUSTER NODES AND STATELESS WITNESS FOR CLUSTER NODES", filed on Sep. 23, 2015 and incorporated by reference herein.

TECHNICAL FIELD

This application is related to the field of data storage and, more particularly, to systems for managing data and resources in a virtualized environment.

BACKGROUND OF THE INVENTION

In current storage networks, and particularly storage networks including geographically distributed directors (or nodes) and storage resources, it is desirable to maintain data consistency throughout so that different hosts in different locations see the same data. An example of a system for providing distributed data coherence is described in U.S. Pat. No. 7,975,018 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

Data transfer among storage devices, including transfers for data replication or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Coordinating and controlling the sharing of resources distributed among these different storage nodes may, in many cases, be difficult or problematic using known technologies.

Accordingly, it is desirable to provide an effective and efficient system to address issues like that noted above for a distributed system.

SUMMARY OF THE INVENTION

According to the system described herein, managing reservations for at least two different sites competing for a resource includes maintaining a table of groups of sites, where each group competes for the same resource, one of the at least two different sites requesting a reservation for a particular resource, determining if the reservation is available by consulting the table, denying the reservation to the one of the at least two different sites in response to access having been previously reserved for an other one of the at least two different sites, and granting the reservation to the one of the at least two different sites and reserving access for the one of the at least two different sites in response to the resource being available. The managed resources may correspond to data storage and the at least two different sites may be mirrored storage devices. In response to a failure of communication between the at least two different sites, pending writes may be failed. Following granting the reservation to a particular one of the at least two different sites, the particular one of the at least two different sites may accept subsequent write operations. Following denying the reservation to a particular one of the at least two different sites, the particular one of the at least two different sites may reject subsequent write operations. Managing reservations for at least two different sites competing for a resource may also include delaying a predetermined amount of time following the one of the at least two different sites requesting a reservation for a particular resource and the one of the at least two different sites not being a primary site. Managing reservations for at least two different sites competing for a resource may also include determining if the resource is available following delaying the predetermined amount of time. Managing reservations for at least two different sites competing for a resource may also include setting a timer to an initial value for the one of the at least two different sites following reserving access for the one of the at least two different sites. Managing reservations for at least two different sites competing for a resource may also include periodically decrementing the timer. Managing reservations for at least two different sites competing for a resource may also include making the resource available following reserving access for the one of the at least two different sites in response to the timer being decremented to be less than or equal to zero.

According further to the system described herein, a non-transitory computer-readable storage medium contains software that manages reservations for at least two different sites competing for a resource. The software includes executable code that maintains a table of groups of sites, where each group competes for the same resource, executable code that determines, by consulting the table, if a reservation is available to one of the at least two different sites requesting the reservation for a particular resource, executable code that denies the reservation to the one of the at least two different sites in response to access having been previously reserved for an other one of the at least two different sites, and executable code that grants the reservation to the one of the at least two different sites and reserves access for the one of the at least two different sites in response to the resource being available. The managed resources may correspond to data storage and the at least two different sites may be mirrored storage devices. In response to a failure of communication between the at least two different sites, pending writes may be failed. Following granting the reservation to a particular one of the at least two different sites, the particular one of the at least two different sites may accept subsequent write operations. Following denying the reservation to a particular one of the at least two different sites, the particular one of the at least two different sites may reject subsequent write operations. The software may also include executable code that delays a predetermined amount of time following the one of the at least two different sites requesting a reservation for a particular resource and the one of the at least two different sites not being a primary site. The software may also include executable code that determines if the resource is available following delaying the predetermined amount of time. The software may also include executable code that sets a timer to an initial value for the one of the at least two different sites following reserving access for the one of the at least two different sites. The software may also include executable code that periodically decrements the timer. The software may also include executable code that makes the resource available following reserving access for the one of the at least two different sites in response to the timer being decremented to be less than or equal to zero.

According further to the system described herein, providing multiple witnesses that manage resources for at least two different sites includes one of the at least two different sites choosing a particular one of the witnesses, the one of the at least two different sites confirming that the particular one of the witnesses is available to manage resources, the one of the at least two different sites communicating with other ones of the at least two different sites to determine if the particular one of the witnesses is acceptable to the other ones of the at least two different sites, and choosing the particular one of the witnesses in response to the particular one of the witnesses being available to manage resources and the particular one of the witnesses being acceptable to all of the other ones of the at least two different sites. The managed resources may correspond to data storage and the at least two different sites may be mirrored storage devices. The particular one of the witnesses may be chosen to determine a particular one the mirrored storage devices that will receive a reservation to accept writes following a failure of communication between the at least two different sites. The particular one the mirrored storage devices may accept writes for a predetermined amount of time following requesting the reservation. The at least two different sites may periodically renegotiate a different one of the multiple witnesses. The period may be ten minutes. In response to none of the witnesses being acceptable to each of the at least two different sites, a default one of the witnesses may be chosen. The particular one of the witnesses may be acceptable to the other ones of the at least two different sites if the other ones of the at least two different sites can communicate with the particular one of the witnesses.

According further to the system described herein, a non-transitory computer-readable medium contains software that provides multiple witnesses that manage resources for at least two different sites. The software includes executable code at one of the at least two different sites that chooses a particular one of the witnesses, executable code at one of the at least two different sites that confirms that the particular one of the witnesses is available to manage resources, executable code at one of the at least two different sites communicates with other ones of the at least two different sites to determine if the particular one of the witnesses is acceptable to the other ones of the at least two different sites, and executable code at one of the at least two different sites that chooses the particular one of the witnesses in response to the particular one of the witnesses being available to manage resources and the particular one of the witnesses being acceptable to all of the other ones of the at least two different sites. The managed resources may correspond to data storage and the at least two different sites may be mirrored storage devices. The particular one of the witnesses may be chosen to determine a particular one the mirrored storage devices that will receive a reservation to accept writes following a failure of communication between the at least two different sites. The particular one the mirrored storage devices may accept writes for a predetermined amount of time following requesting the reservation. The at least two different sites may periodically renegotiate a different one of the multiple witnesses. The period may be ten minutes. In response to none of the witnesses being acceptable to each of the at least two different sites, a default one of the witnesses may be chosen. The particular one of the witnesses may be acceptable to the other ones of the at least two different sites if the other ones of the at least two different sites can communicate with the particular one of the witnesses.

According further to the system described herein, maintaining write consistency between at least two mirrored storage devices includes receiving a write request for a particular block at a particular one of the storage devices, obtaining a reservation for the particular block at the particular one of the storage devices, waiting for the particular block at the particular one of the storage devices to become available in response to not being able to successfully obtain the reservation, writing the particular block at the particular one of the storage devices in response to successfully obtaining the reservation, writing the particular block at a remote one of the storage devices following writing the particular block at the particular one of the storage devices, determining if a retryable indicator is received in response to writing the particular block at a remote one of the storage devices failing, waiting a predetermined amount of time and releasing the reservation in response to writing the particular block at a remote one of the storage devices failing and receiving the retryable indicator, responding to the write request with a success indicator and releasing the reservation in response to writing the particular block at a remote one of the storage devices succeeding, and responding to the write request with a failure indicator and releasing the reservation in response to writing the particular block at a remote one of the storage devices failing and not receiving the retryable indicator. The predetermined amount of time may be two hundred milliseconds. The remote site may return the retryable indicator in response to the remote site being deemed a primary site. The at least two mirrored storage devices may be coupled to a switch. The switch may be coupled to a plurality of host devices that access the at least two storage devices. The switch may cause the at least two mirrored storage devices to appear as a single storage device. Following waiting for the particular block at the particular one of the storage devices to become available in response to not being able to successfully obtain the reservation, the I/O may time out and fails. The blocks may be a fixed length of 512 bytes.

According further to the system described herein, a non-transitory computer-readable medium contains software that maintains write consistency between at least two mirrored storage devices. The software includes executable code that receives a write request for a particular block at a particular one of the storage devices, executable code that obtains a reservation for the particular block at the particular one of the storage devices, executable code that waits for the particular block at the particular one of the storage devices to become available in response to not being able to successfully obtain the reservation, executable code that writes the particular block at the particular one of the storage devices in response to successfully obtaining the reservation, executable code that writes the particular block at a remote one of the storage devices following writing the particular block at the particular one of the storage devices, executable code that determines if a retryable indicator is received in response to writing the particular block at a remote one of the storage devices failing, executable code that waits a predetermined amount of time and releases the reservation in response to writing the particular block at a remote one of the storage devices failing and receiving the retryable indicator, executable code that responds to the write request with a success indicator and releases the reservation in response to writing the particular block at a remote one of the storage devices succeeding, and executable code that responds to the write request with a failure indicator and releases the reservation in response to writing the particular block at a remote one of the storage devices failing and not receiving the retryable indicator. The predetermined amount of time may be two hundred milliseconds. The remote site may return the retryable indicator in response to the remote site being deemed a primary site. The at least two mirrored storage devices may be coupled to a switch. The switch may be coupled to a plurality of host devices that access the at least two storage devices. The switch may cause the at least two mirrored storage devices to appear as a single storage device. Following waiting for the particular block at the particular one of the storage devices to become available in response to not being able to successfully obtain the reservation, the I/O may time out and fails. The blocks may be a fixed length of 512 bytes.

BRIEF DESCRIPTION OF THE DRAWINGS

Embodiments of the system described herein are explained with reference to the several figures of the drawings, which are briefly described as follows.

FIG. 15 shows a plurality of sites and a plurality of witness according to an embodiment of the system described herein.

DETAILED DESCRIPTION OF VARIOUS EMBODIMENTS

Figure 1:
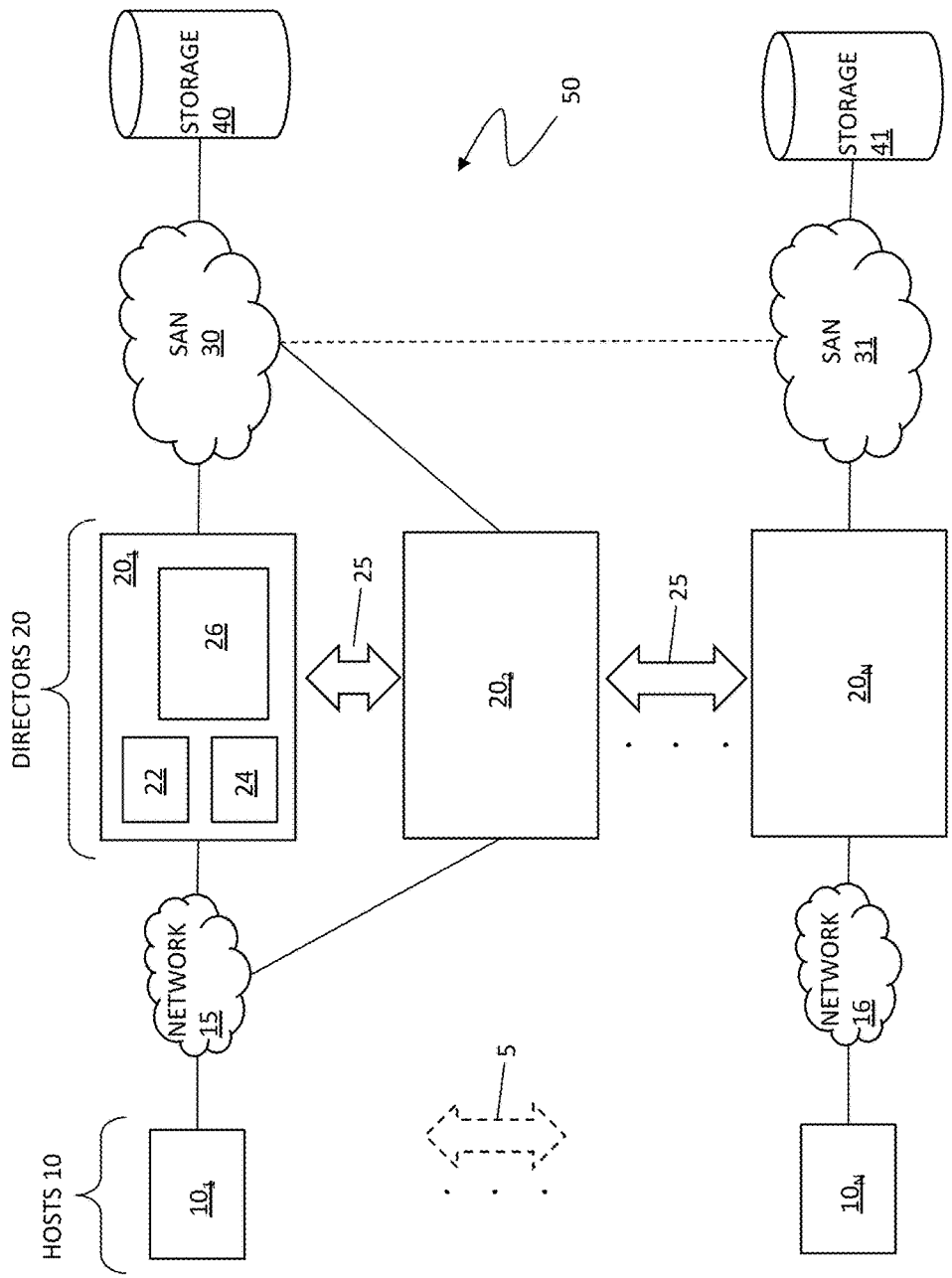
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 ($10_1$ to $10_N$) are communicably coupled with a plurality of directors 20 ($20_1$, $20_2$ to $20_N$). Each of the directors 20 may include a processor (CPU) component 22, such as a microprocessor or other intelligence module, a cache component 24 (e.g., RAM cache), an instance of a distributed cache manager 26 and/or other local storage and communication ports. (In general, "N" is used herein to indicate an indefinite plurality, so that the number "N" when referred to one component does not necessarily equal the number "N" of a different component. For example, the number of hosts 10 may or may not equal the number of directors 20 in FIG. 1.) Cache memory may be considered memory that is faster and more easily accessible by a processor than other non-cache memory used by a device.

Each of the hosts 10 may be communicably coupled to one or more of directors 20 over one or more network connections 15, 16. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another. It is also noted that in various embodiments the networks 15, 16 may be combined with one or more storage area networks (SAN) 30, 31.

Each of the directors 20 may also include, or be communicably coupled with, one or more file systems, such as a virtual machine file system (VMFS), a new technology file system (NTFS) and/or other appropriate file system, and may be communicably coupled with one or multiple storage resources 40, 41, each including one or more disk drives and/or other storage volumes, over the SANs 30, 31, and/or other appropriate network, such as a LAN, WAN, etc. The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to communicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16. Several of the directors 20 may be clustered together at one or more sites and in which the sites are geographically distant from one another. The system described herein may be used in connection with a vSphere and/or VPLEX product produced by VMware Inc. of Palo Alto, Calif. and EMC Corporation of Hopkinton, Mass., respectively. The system described herein may also be used in connection with an storage product produced by EMC Corporation, such as a Symmetrix product. Although discussed and illustrated in connection with embodiment for a distributed storage system, the system described herein may generally be used in connection with any appropriate distributed processing system.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31 that allows access to data stored on the storage networks. However, it may be appreciated that a director may also be embodied as an intelligent fabric switch, a hub adapter and/or other appropriate network device and may also be implemented as a virtual machine, as further discussed elsewhere herein. Because Locality Conscious Directory Migration (LCDM) is applicable to databases, any suitable networked director may be configured to operate as an access node with distributed cache manager functionality. For example, a distributed cache manager may be run on one or more desktop computers and/or virtual machines with a network connection.

A distributed storage system may enable a storage device to be exported from multiple distributed directors, which may be either appliances or arrays, for example. In an active/active storage system, if there are multiple interfaces to a storage device, each of the interfaces may provide equal access to the storage device. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A VM image is the state of the virtual machine as it resides in the host's memory. The VM image may be obtained for an operating VM and transferred to another location where the VM continues execution from the state defined by the virtual machine image. In this way, the VM image may be a snapshot of an execution state of a program by a VM that may be moved between different locations and processing thereafter continued without interruption.

As discussed in detail elsewhere herein, in a virtualized environment, a virtual center, an example of which may be a vCenter product produced by VMware, may provide a central point of control for managing, monitoring, provisioning and migrating virtual machines. Virtual centers may operate to control virtual machines in data centers and, for example, in connection with cloud computing. A virtual center may further include a virtual data center that provides logical control and management of data storage in a data center. A virtual center may be used in connection with an infrastructure platform that provides an integrated package of components to provide network, compute and/or storage services for use in a virtualized environment. One example of an infrastructure platform is a Vblock product produced by VCE Company, LLC of Richardson, Tex. It is noted that the term "Vblock" used herein may also be generally understood as including and referring to any appropriate software and/or component packages of a converged infrastructure product that provides network, compute and/or storage services for use in a virtualized computing environment. For example, other suitable types of converged infrastructure products may include EMC Corporation's VMAX SP and/or VSPEX products. Management of a Vblock and/or other appropriate type of converged infrastructure product may be provided by an appropriate software element. For example, EMC's Ionix Unified Infrastructure Manager (UIM) may be integrated with Vblock and provide a management console for management of the Vblock package.

Figure 2:
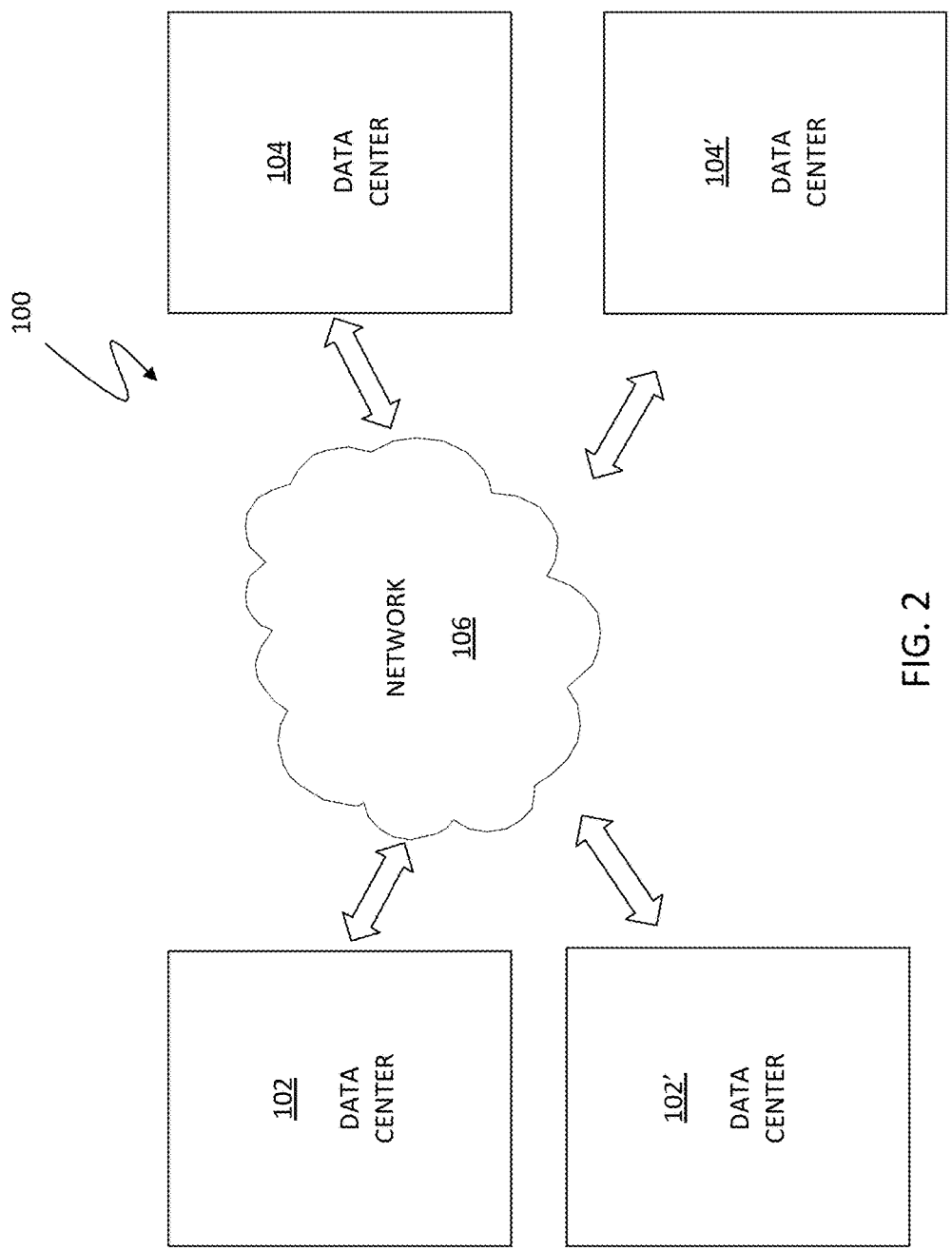
FIG. 2 is a schematic illustration showing a system that includes a plurality of data centers in communication via a network that may be used in accordance with an embodiment of the system described herein.

FIG. 2 is a schematic illustration showing a system 100 that includes a first data center 102 in communication with a second data center 104 via a network 106. Although the following embodiments are discussed principally in connection with data centers 102, 104 any number of additional data centers, represented as data centers 102', 104', may be also be used in connection with the system described herein. Each of the data centers 102, 104 may include a plurality of storage devices and processors (not shown in FIG. 2) for executing applications using a plurality of VMs and which may be controlled and/or managed in connection with one or more virtual centers and virtual data centers. The VMs may be configured using any appropriate server virtualization technology, such as that provided by VMware, Inc. of Palo Alto, Calif., including vSphere. VSphere is a suite of tools/applications offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 102, 104 may contain any number of processors and storage devices that are configured to provide the functionality described herein. In an embodiment herein, the storage devices may be Symmetrix storage arrays provided by EMC Corporation of Hopkinton, Mass. Other appropriate types of storage devices and different types of processing devices may also be used in connection with the system described herein. The data centers 102, 104 may be configured similarly to each other or may be configured differently. The network 106 may be any network or similar mechanism allowing data communication between the data centers 102, 104. In an embodiment herein, the network 106 may be the Internet and/or any other appropriate network and each of the data centers 102, 104 may be coupled thereto using any appropriate mechanism. In other embodiments, the network 106 may represent a direct connection (e.g., a physical connection) between the data centers 102, 104.

In various embodiments, VMs may be migrated from a source one of the data centers 102, 104 to a destination one of the data centers 102, 104. VMs may be transferred from one data site to another, including VM mobility over geographical distances, for example, for reasons of disaster avoidance, load balancing and testing, among other reasons. For a discussion of migrating VMs, reference is made to U.S. Pat. No. 9,110,693 to Meiri et al. issued on Aug. 18, 2015 and entitled "VM Mobility Over Distance," and U.S. Pat. No. 8,667,490 to Van Der Goot, issued on Mar. 4, 2014 and entitled "Active/Active Storage and Virtual Machine Mobility Over Asynchronous Distances," which are incorporated herein by reference. A product, such as EMC's VPLEX Metro and/or VPLEX Geo, may be used to enable the resources of disparate storage systems in dispersed data centers to be federated and/or coordinated and utilized as a single pool of virtual storage. VPLEX allows for logical storage units (e.g., logical unit numbers (LUNs)), provisioned from various storage arrays, to be managed through a centralized management interface. Products like VPLEX Metro or Geo provide for data mobility, availability and collaboration through active/active data over synchronous and asynchronous distances with provide for the ability to non-disruptively move many VMs. It is noted that the term "VPLEX" used herein may also generally be understood to refer to and include any appropriate software and/or component packages that provide for coordinating and/or federating resources of disparate systems as a single pool of virtual resources, in particular, for example, a single pool of virtual storage.

Figure 3:
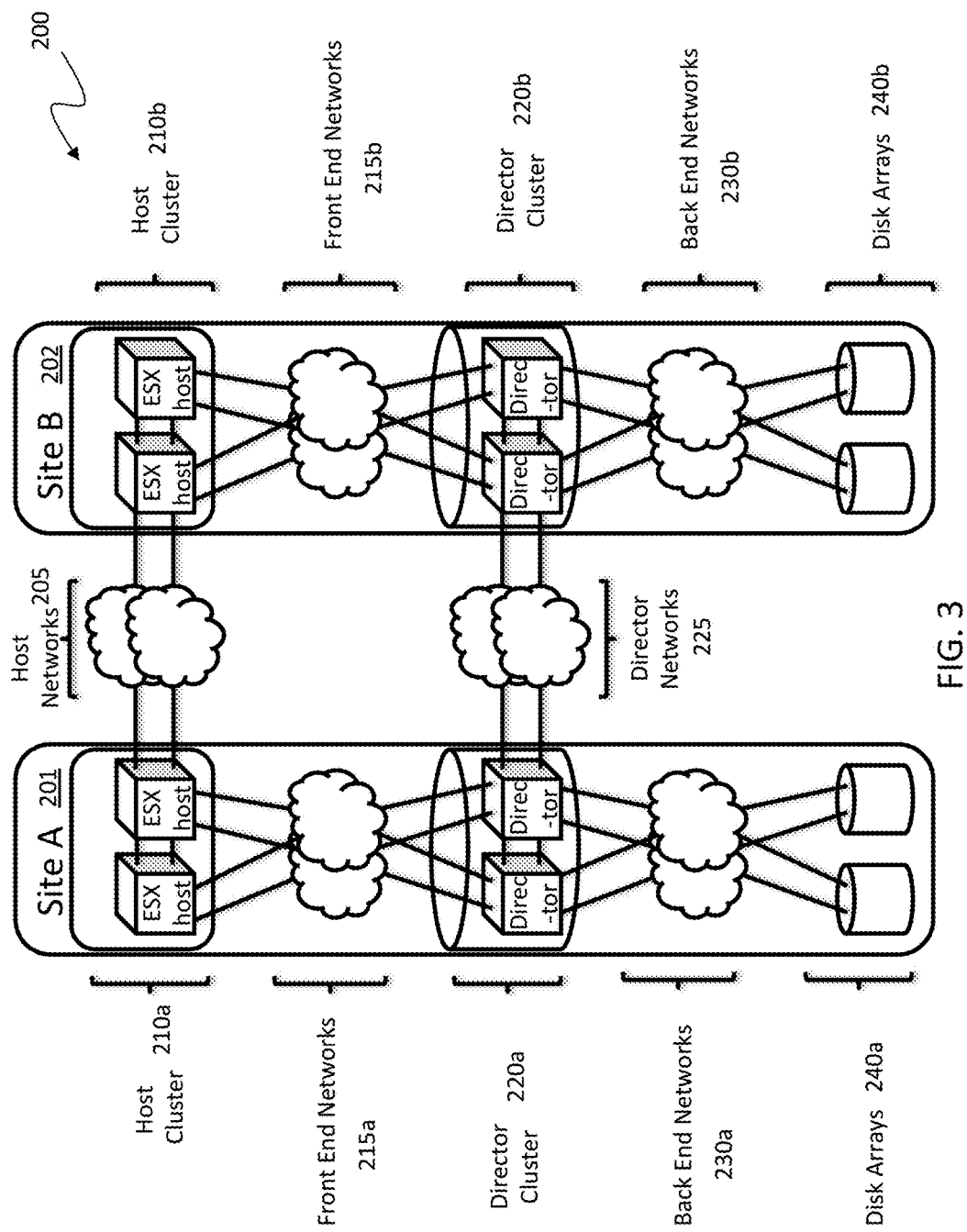
FIG. 3 is a schematic illustration showing a distributed storage system with multiple sites according to an embodiment of the system described herein.

FIG. 3 is a schematic illustration showing a distributed storage system 200 having multiple sites according to an embodiment of the system described herein. Although illustrated with two sites, Site A 201 and Site B 202, the system described herein may also operate in connection with additional sites. Although components are specifically identified with respect to Site A 201, Site B 202 (or any additional site) may also include the components discussed herein. The sites 201, 202 may include one or more hosts grouped in host clusters 210a,b, one or more directors grouped in director clusters 220a,b, and disk arrays 240a,b. Each host cluster 210a,b and director cluster 220a,b may each include software and/or other controllers or interfaces to control or administer operations in connection with described functions of the hosts and directors. In an embodiment, each host cluster 210a,b may include hosts, such as ESX hosts, in a vSphere cluster and each director cluster 220a,b may include directors in a VPLEX cluster. It is noted that although ESX hosts and illustrated and discussed herein as examples, any appropriate host may be used in connection with the system described herein. Front end networks 215a,b may connect through host links to the host clusters 210a,b and through front end links to the director clusters 220a,b. One or more back end networks 230a,b may connect through back end links to the director clusters 220a,b and through array links to the disk arrays 240a,b. In an embodiment, the front and back end networks may be Fibre Channel networks. The front end networks 215a,b allow the hosts (or VMs running therein) to perform I/O operations with the host clusters 210a,b, while the back end networks 230a,b allow the directors of the director clusters 220a,b to perform I/O on the disk arrays 240a,b. One or more host networks 205, such as vSphere Ethernet networks, connect the ESX hosts in host clusters 210a,b. One or more director networks 225 connect the directors of the director clusters 220a,b.

Various types of failures, including network failures within a cluster, may result in behaviors that are further discussed elsewhere herein. It should be noted that the host cluster 210a,b (e.g., vSphere cluster) may be connected in such a way that VMs can keep their network (e.g., IP, FC, IB) addresses when migrating between clusters (for example, by means of a vLan or an open vSwitch). In an embodiment, VPLEX may be used and configured to expose one or more distributed volumes from both VPLEX director clusters. A VMFS may be created on top of these distributed volumes allowing VMs that migrate between the sites to see the same file system in either site. It is also noted that, as illustrated and according to various embodiments, each site 201, 202 may include redundancies in hosts, directors and links therebetween.

In some embodiments, the system described herein may be used in connection with a first set of one or more data centers that are relatively active (primary data centers) and a second set of one or more data centers that are relatively inactive (failover data centers). The first set of data centers and second set of data centers may both be used for application reading and writing, but the first set of data centers may be more active and/or include more response time sensitive applications than the second set of data centers. Each of the relatively active data centers in the first set of data centers may use at least one corresponding data center in the second set of data centers for failover operations. It should also be noted that in addition to the active/active system described herein, the system described herein may also be used in active/passive functioning as appropriate or desired.

I/O access may be provided to distributed volumes in an active/active system with two sites separated by an asynchronous latency. For asynchronous operation, a write operation to cluster at a remote site may be acknowledged as soon as a protection copy is made within the cluster.

Sometime later the write data is synchronized to the remote site. Similarly, writes to the remote site are later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the inter-cluster link on an as needed basis. In the background, the controller (VPLEX) may synchronize the dirty data between the clusters.

The above operations may work as long as the inter-cluster network is available. If the inter-cluster link fails, both clusters may contain dirty data that is unknown by the respective remote clusters. As a consequence of this failure, the director cluster may rollback the image of the data to a write order consistent point. In other words, the director cluster may rollback the image of the data to a point where it knows the data that is available on both clusters, or to a time where the write data was exchanged between both sites. The director cluster may also guarantee rollback to an image of the disk or volume that is write order consistent, which means that if the data of a specific write is available on the volume, all data of writes that were acknowledged before ("preceded") that write should be present too. Write order consistency is a feature that allows databases to recover by inspecting the volume image. As noted elsewhere herein, known techniques may provide write order consistency by grouping writes in what are called deltas and providing the consistency on a delta boundary basis (see, e.g. U.S. Pat. No. 7,475,207 to Bromling et al.).

Suspend/resume migration processing may involve suspending a VM in the source site and resuming that VM in the destination site. Before the suspended VM is resumed, all dirty data for the affected VMFS may be synchronized from the source VPLEX cluster to the destination VPLEX cluster, and the preference (i.e. "winner" site) for the distributed volume may be changed from the source cluster to the destination cluster. The preference attribute may be related to a VPLEX consistency group that contains one or more VMs. Hence, the VM may be in a consistency group of its own or all VMs in a consistency group may be migrated together. To know when the synchronization of VPLEX's dirty cache is finished, the customer may map the VMFS to a distributed volume.

Failures may also occur when a VM is migrated while performing I/O operations. In an example, the migration of a VM during I/O operations may be referred to herein as "vMotion" and may be facilitated by a VMware product called vMotion. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays. For further detailed discussion of specific system behaviors in connection with different types of failure scenarios, reference is made to U.S. Pat. No. 8,667,490 to Van Der Goot, as cited elsewhere herein.

Figure 4:
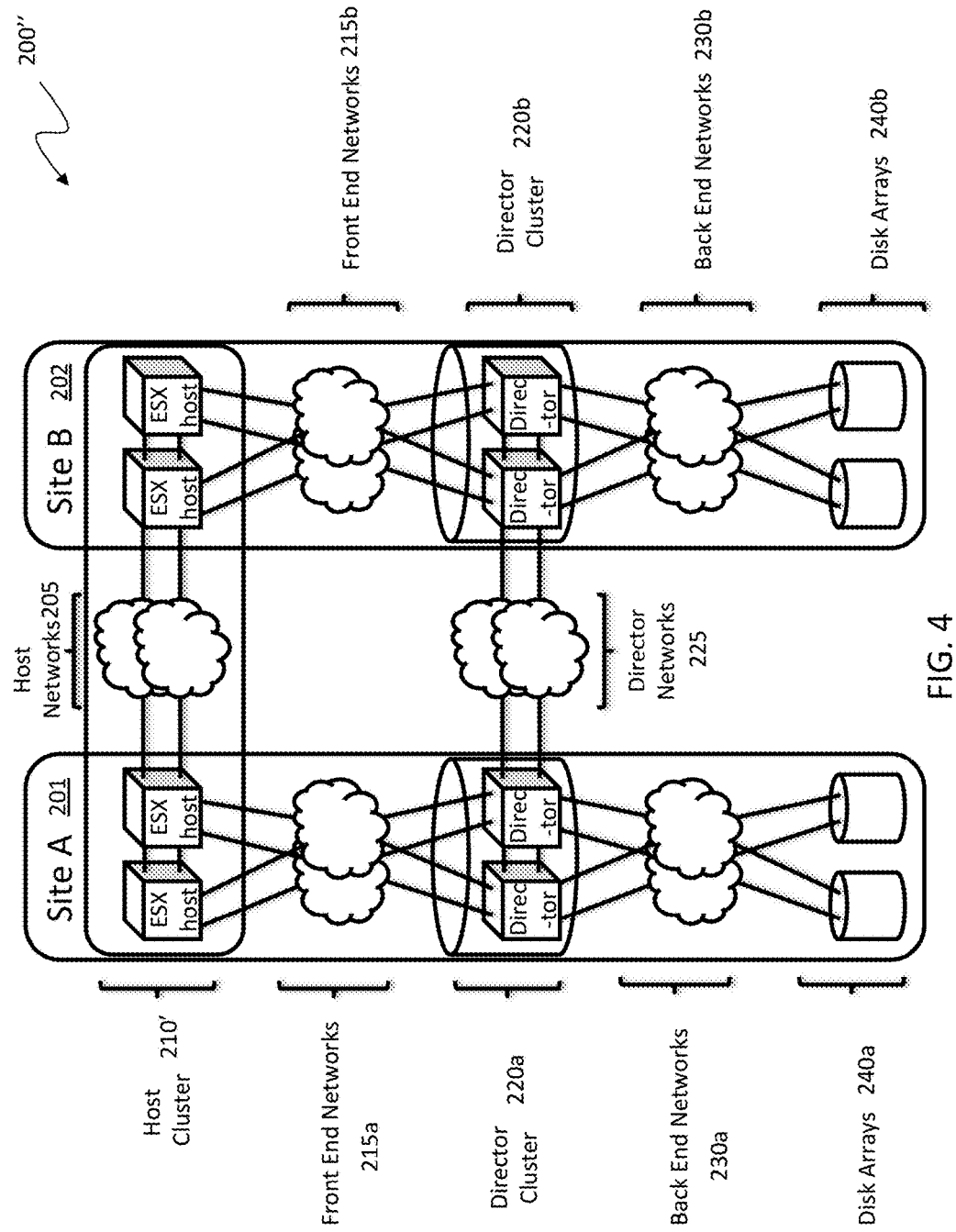
FIGS. 4 and 5 show alternative configurations of distributed storage systems that may be used in accordance with embodiments of the system described herein.
Figure 5:
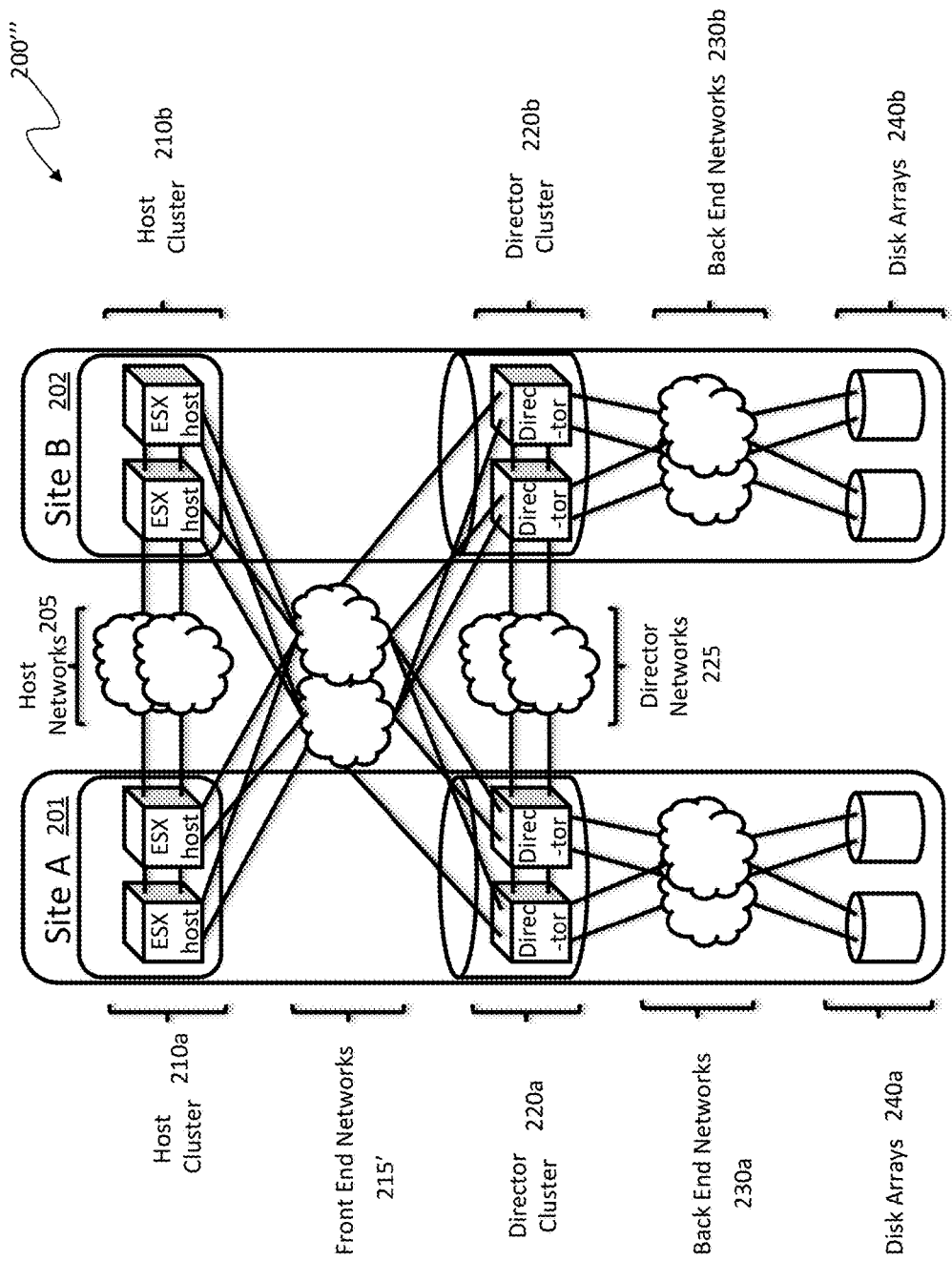

FIGS. 4 and 5 show alternative configurations for distributed storage systems that may be used in accordance with embodiments of the system described herein. In FIG. 4, a distributed storage system 200" is shown that includes a host cluster 210' as a distributed processing layer operating across the multiple sites 201, 202 and otherwise having elements like that discussed elsewhere herein. In FIG. 5, a distributed storage system 200''' is shown in which the front end networks 215' are shown operating as an external network accessed by each of the sites 201, 202 and otherwise having elements like that discussed elsewhere herein.

Figure 6:
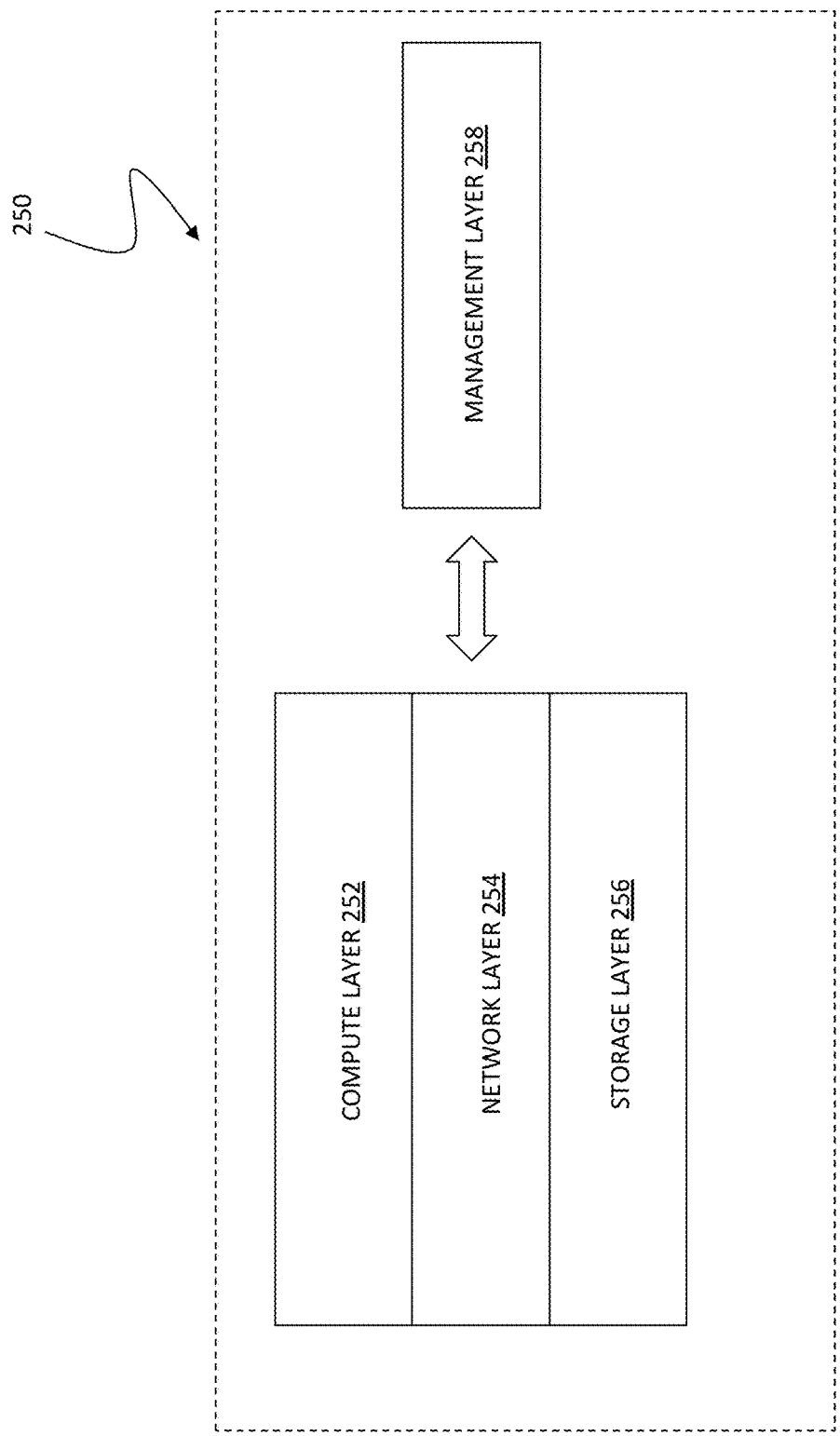
FIG. 6 shows an exemplary cloud computing system that may be used in connection with various embodiments of the system described herein in a manner similar to that discussed herein in connection with other types of distributed processing systems.

FIG. 6 shows an exemplary cloud computing system 250 that may be used in connection with various embodiments of the system described herein in a manner similar to that discussed herein in connection with other types of distributed processing systems. The system 250 may include a compute layer 252, a network layer 254, a storage layer 256 and/or a management layer 258. In various embodiments, the system described herein may provide for dynamic federation of distributed resources that may include storage, compute and/or network resources. The system 250 may be understood as providing a cloud computing environment or platform that may be used in connection with cloud storage and/or other appropriate cloud processing applications. The layers 252, 254, 256 and 258 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute and storage layers 252, 256 within systems and/or between multiple cloud computing systems and to the client or customer network. The management layer 258 may provide one or more components used to manage one or more of the layers 252, 254 and/or 256. In an embodiment, the management layer 258 may include EMC Corporation's Unified Infrastructure Manager (UIM), as further discussed elsewhere herein.

Figure 7:
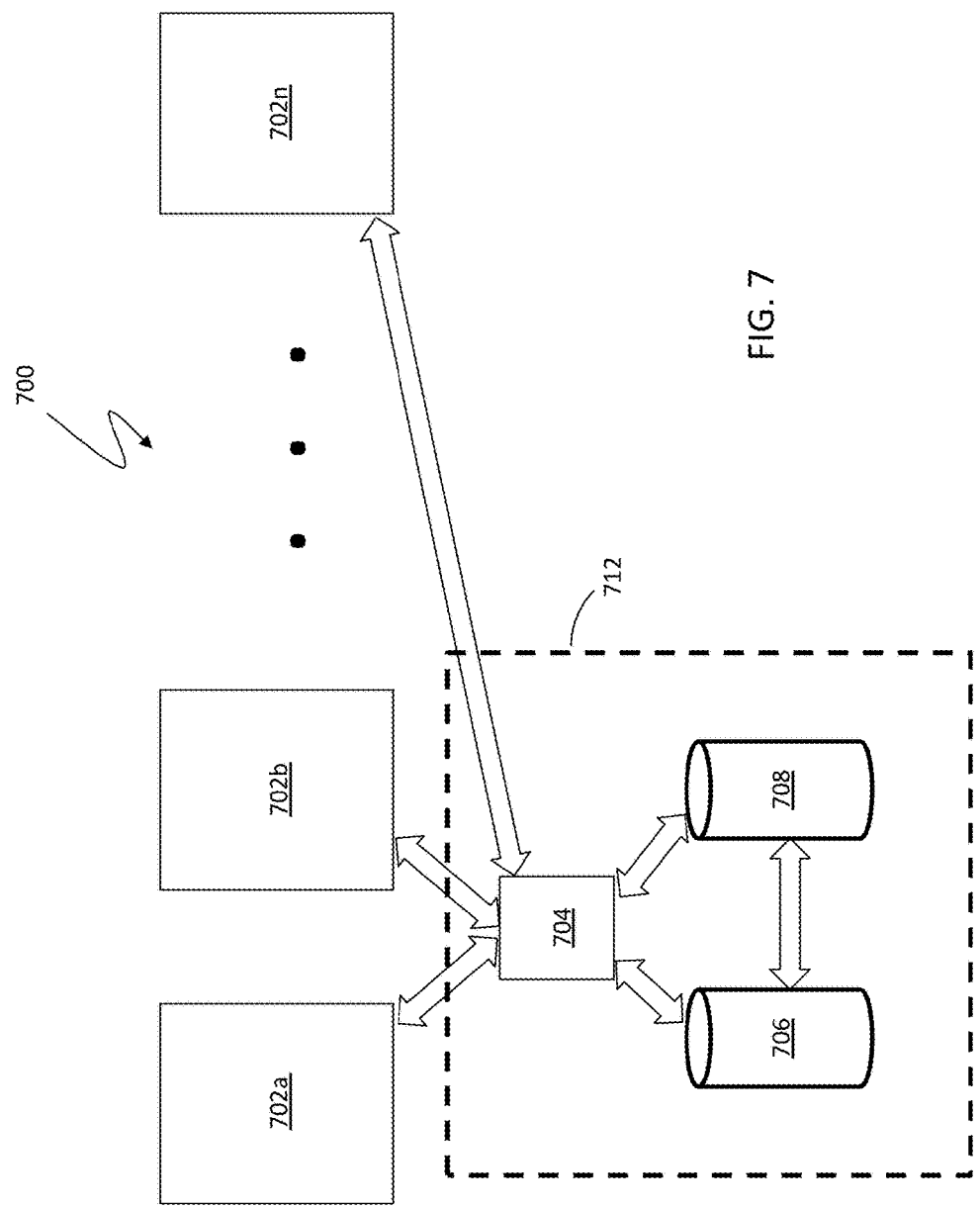
FIG. 7 shows a plurality of hosts accessing an active/active storage configuration according to an embodiment of the system described herein.

Referring to FIG. 7, a diagram 700 illustrates a plurality of hosts 702a-702n couple to a switch 704 which is coupled to storage devices 706, 708. There may be any number of the hosts 702a-702n and the system described herein can also work with a single host. There also may be any number of storage devices. The switch 704 provides connectivity between the hosts 702a-702n and the storage devices 706, 708 and may be implemented using a SAN and/or by any appropriate technology that provides the functionality described herein. The switch 704 is coupled to the storage devices 706, 708 to facilitate an active/active synchronous configuration where each of the storage devices 706, 708 is configured to be a mirror for the other one of the storage devices 706, 708 and where the storage devices 706, 708 and the switch appear to the hosts 702a-702n as a single storage device, which is represented by a box 712.

Writes from each of the hosts 702a-702n are initially provided to one of the storage devices 706, 708 and then transferred to an other one of the storage devices 706, 708 using, for example, SRDF/S communication provided by EMC Corporation of Hopkinton, Mass. or by any other appropriate data transfer mechanism. Ideally, the storage devices 706, 708 are always in the same state so that a read operation from one of the hosts 702a-702n would read from either of the storage devices 706, 708 and would always read the same data irrespective of which of the storage devices 706, 708 provides the data for the read operation.

In some cases, maintaining synchronization between the storage devices 706, 708 may become challenging for any number of reasons. As described in more detail below, the system described herein maintains consistency between the storage devices 706, 708 even when one or more of the hosts 702a-702n writes to a first location and a second location at the same time or nearly the same time where the first location is on one of the storage devices 706, 708 and the second location on an other one of the storage devices 706, 708 and is a mirror of the first location. The system also maintains consistency when a write is aborted prior to completion/synchronization.

Figure 8:
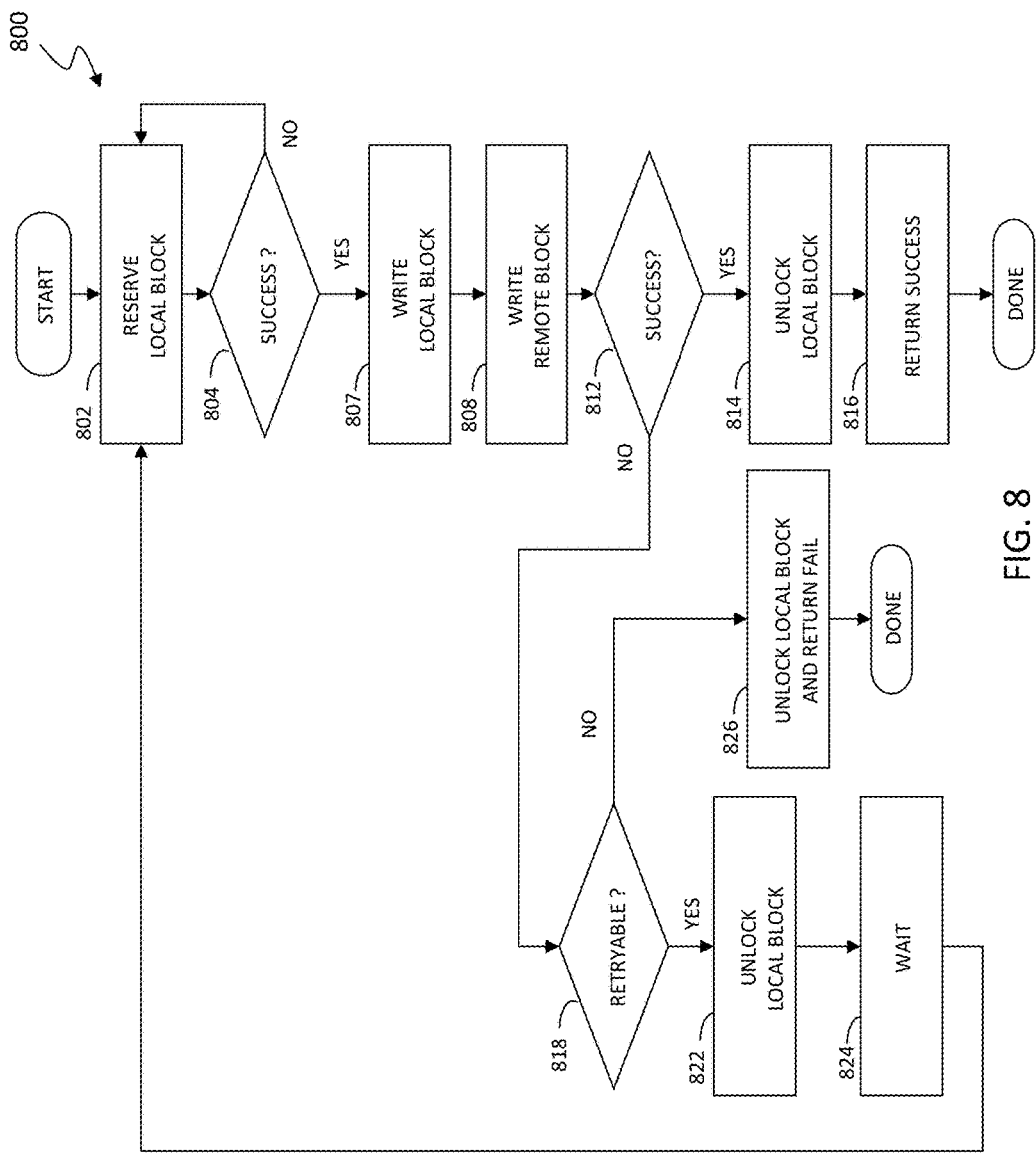
FIG. 8 is a flow diagram indicating processing performed in connection with accessing an active/active storage configuration according to an embodiment of the system described herein.

Referring to FIG. 8, a flow diagram 800 illustrates steps performed by one of the storage devices 706, 708 in connection with handling a write request from one of the hosts 702a-702n. Processing begins at a first step 802 where a local block corresponding to the write operation is reserved (locked). In an embodiment herein, the storage devices 706, 708 handle I/O operations a block at a time, where a block is a fixed contiguous storage area of 512 bytes. Of course, other block sizes and even variable block sizes are also possible. Thus, for the discussion herein, references to blocks of data should be understood to refer to any amount of data.

Following the step 802 is a test step 804 where it is determined if reserving the local block at the step 802 was successful. Note that reserving the local block at the step 802 may be unsuccessful for any number of reasons, including the block having been previously reserved for another (possibly unrelated) purpose. If it is determined at the step 804 that attempting to reserve the local block at the step 802 was unsuccessful, then control transfers from the test step 804 back to the step 802, discussed above, for another attempt to reserve the local block. In some embodiments (not shown in FIG. 8), after a number of possible retries, the I/O may timeout due to other system I/O mechanisms, after which the system may fail the write.

If it is determined at the step 804 that attempting to reserve the local block at the step 802 was successful, then control transfers from the test step 804 to a step 807 where the data is written to the local block. Following the step 807 is a step 808 where the storage devices attempts to write a mirror of the local block (remote block) at the remote storage device. The write to the remote storage device may be performed using, for example, the SRDF/S product provided by the EMC Corporation of Hopkinton, Mass. Following the step 808 is a test step 812 where it is determined if the write to the remote storage device was successful. If so, then control transfers from the test step 812 to a step 814 where the reservation (lock) for the local block is removed. Following the step 814 is a step 816 where the system returns a success indication to a calling process/device (e.g., a host) to indicate that the write operation was successful. Following the step 816, processing is complete.

If it is determined at the test step 812 that the write to the remote storage device was not successful, then control transfers from the test step 812 to a test step 818 where it is determined if the result returned by the remote storage device indicates that the remote write is retryable. The remote storage device returning a retryable indication is described in more detail elsewhere herein. If it is determined at the test step 818 that the remote storage device returned a retryable indication, then control transfers from the test step 818 to a step 822 where the reservation (lock) for the local block is removed, thus allowing other processes/devices to reserve the block. Following the step 822 is a step 824 where the system waits a predetermined amount of time (e.g., 200 msec). Following the step 824, control transfers back to the step 802, described above, for another iteration to attempt to write and synchronize the data. If it is determined at the test step 818 that the remote storage device did not return a retryable indication (i.e., the failure was due to some other reason), then control transfers from the test step 818 to a step 826 where the system the removes the reservation (lock) for the local block and returns a failure indication to a calling process/device (e.g., a host) to indicate that the write operation failed. Following the step 826, processing is complete.

Figure 9:
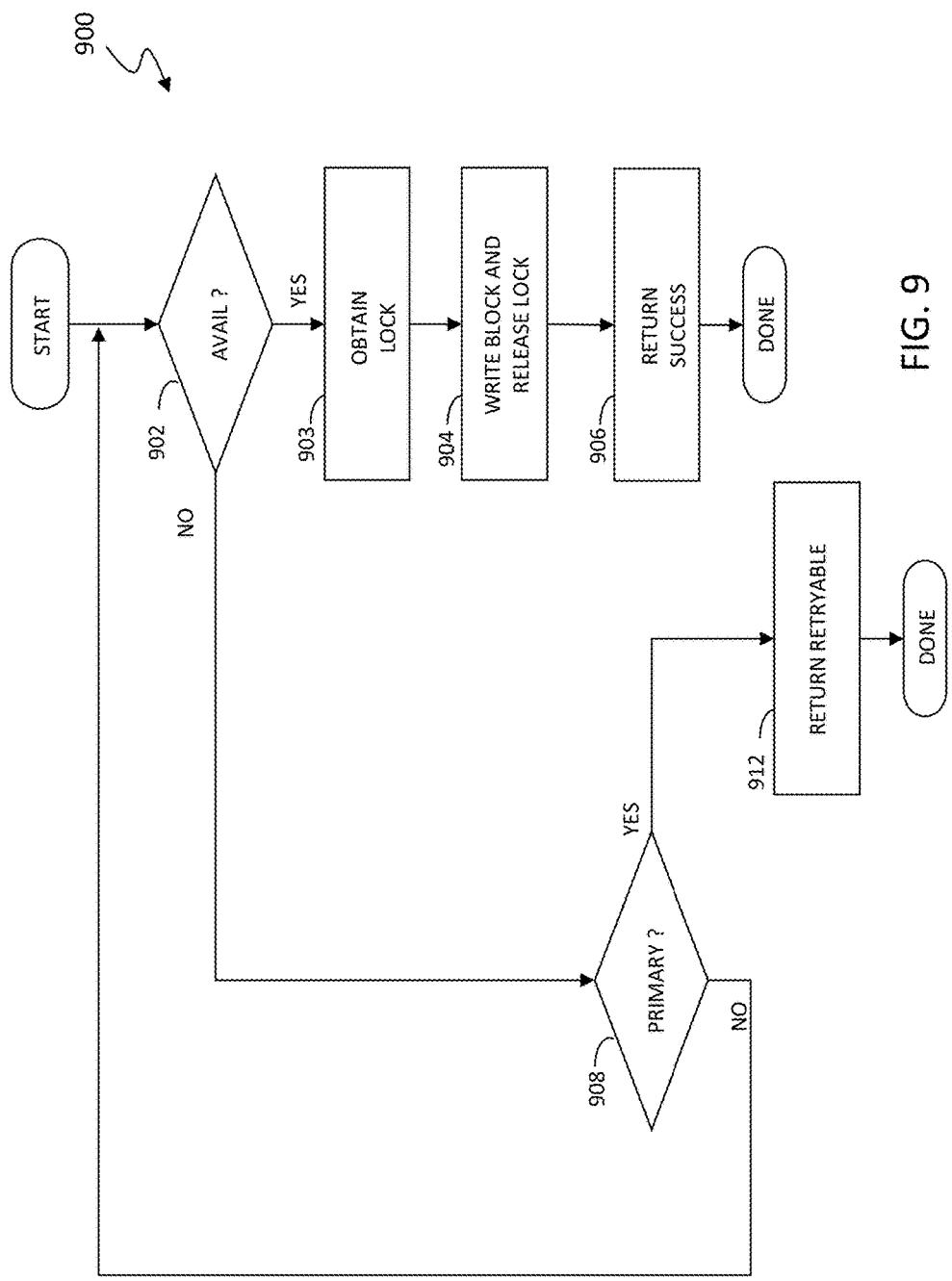
FIG. 9 is a flow diagram indicating processing performed in connection with a request to reserve (lock) a particular block according to an embodiment of the system described herein.

Referring to FIG. 9, a flow diagram 900 illustrates processing performed by one of the storage devices 706, 708 in connection with receiving a write request from an other one of the storage devices 706, 708. Processing begins at a first step 902 where it is determined if a lock (reservation) is available for the block to which the write is being performed. If so, then control transfers from the test step 902 to a step 903 where the lock for the block is obtained. Note that the steps 902, 903 may be combined into a single uninterruptable test-and-set operation. Following the step 903 is a step 904 where the data is written and the lock on the block is released. Following the step 904 is a step 906 where the system returns a success indication to a calling process/device (e.g., the other one of the storage devices 706, 708) to indicate that the write operation was successful. Following the step 906, processing is complete.

If it is determined at the step 902 that the lock (reservation) is not available, then control transfers from the test step 902 to a test step 908 where it is determined if the one of the storage devices 706, 708 performing the processing illustrated by the flow diagram 900 is a deemed a primary storage device. In the system described herein, one of the storage devices 706, 708 is deemed a primary storage device and is given precedence for I/O operations. If it is determined at the test step 908 that the storage device performing the processing is deemed a primary storage device, then control transfers from the test step 908 to a step 912 where the storage device returns a retryable failure indicator to the other one of the storage devices 706, 708 to cause the other one of the storage devices 706, 708 to release the lock on the local block (described above in connection with the step 822 of FIG. 8). Following the step 912, processing is complete.

If it is determined at the test step 908 that the storage device performing the processing is not deemed a primary storage device, then control transfers from the test step 908 to the step 902, discussed above, for another attempt to reserve the block. In some embodiments (not shown in FIG. 9), after a number of possible retries, the I/O may timeout due to other system I/O mechanisms, after which the system may fail the write.

Figure 10:
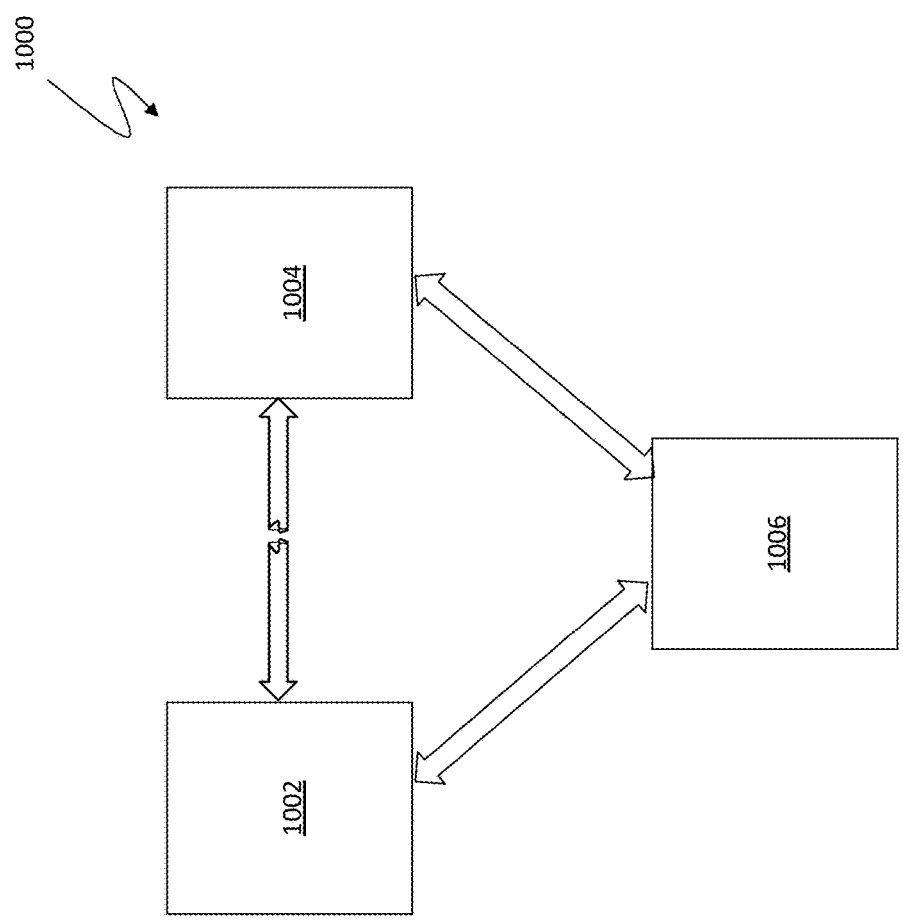
FIG. 10 shows a plurality of sites and a witness according to an embodiment of the system described herein.

Referring to FIG. 10, a diagram 1000 illustrates a first site 1002, a second site 1004, and a witness 1006. The sites 1002, 1004 may be like sites 201, 202, described above, and may include one or more hosts grouped in host clusters, one or more directors grouped in director clusters, disk arrays, etc. where each host cluster and director cluster may each include software and/or other controllers or interfaces to control or administer operations in connection with described functions of the hosts and directors. In some embodiments, the sites 1002, 1004 may represent storage resources. The witness 1006 may be a separate processor or even a separate site like the sites 1002, 1004 capable of providing the functionality described herein. In some embodiments, the witness 1006 may be physically located at one of the sites 1002, 1004, although logically the witness 1006 is separate from the sites 1002, 1004. The sites 1002,

1004 and the witness 1006 may be interconnected using any appropriate technology, such as one or more networks, including the Internet, Fibre Channel networks, Ethernet networks, a SAN network, etc. or by direct non-network connections. Although only the two sites 1002, 1004 are shown, the system described herein may work with any number of sites.

The sites 1002, 1004 are illustrated in the diagram 1000 in a state where communication between the sites 1002, 1004 has failed. Communication failure between the sites 1002, 1004 can occur for any number of reasons, including various hardware and/or software errors as well as errors that are a result of improper configuration or other user errors. In the event of a communication failure between the sites 1002, 1004, the system may have difficulty reconciling data that should otherwise be synchronized between the sites 1002, 1004, according to configurations described in more detail elsewhere herein, such as VPLEX Metro. In such a case, it may be desirable to have the sites 1002, 1004 continue to operate independently, but only allow one of the sites 1002, 1004 to modify data that would be shared between the sites 1002, 1004 if the communication had not failed. That is, the system may control writes by the sites 1002, 1004 when an ability to synchronize data between the sites 1002, 1004 is compromised. For example, if both of the sites 1002, 1004 attempt to write to a particular logical volume, it is desirable to allow only one of the sites 1002, 1004 to write to the particular logical volume while communication between the sites 1002, 1004 is failed. Is such a case, the witness 1006 may be used to determine which of the sites 1002, 1004 is allowed to write to a particular logical volume while the communication between the sites 1002, 1004 is in a failed state. Note that data may be subsequently synchronized once the communication failure has been repaired.

In an embodiment herein, the witness 1006 receives requests from each of the sites 1002, 1004 to be allowed to be the one of the sites 1002, 1004 that accepts writes. The witness 1006 responds to the requests with either a success indicator if the particular one of the sites 1002, 1004 can accept writes or a failure indicator otherwise. If the witness 1006 returns a success indicator to one of the sites 1002, 1004, the witness also maintains a lock/reservation the other one of the sites 1002, 1004 from accepting writes from a host. This is explained in more detail elsewhere herein.

Figure 11:
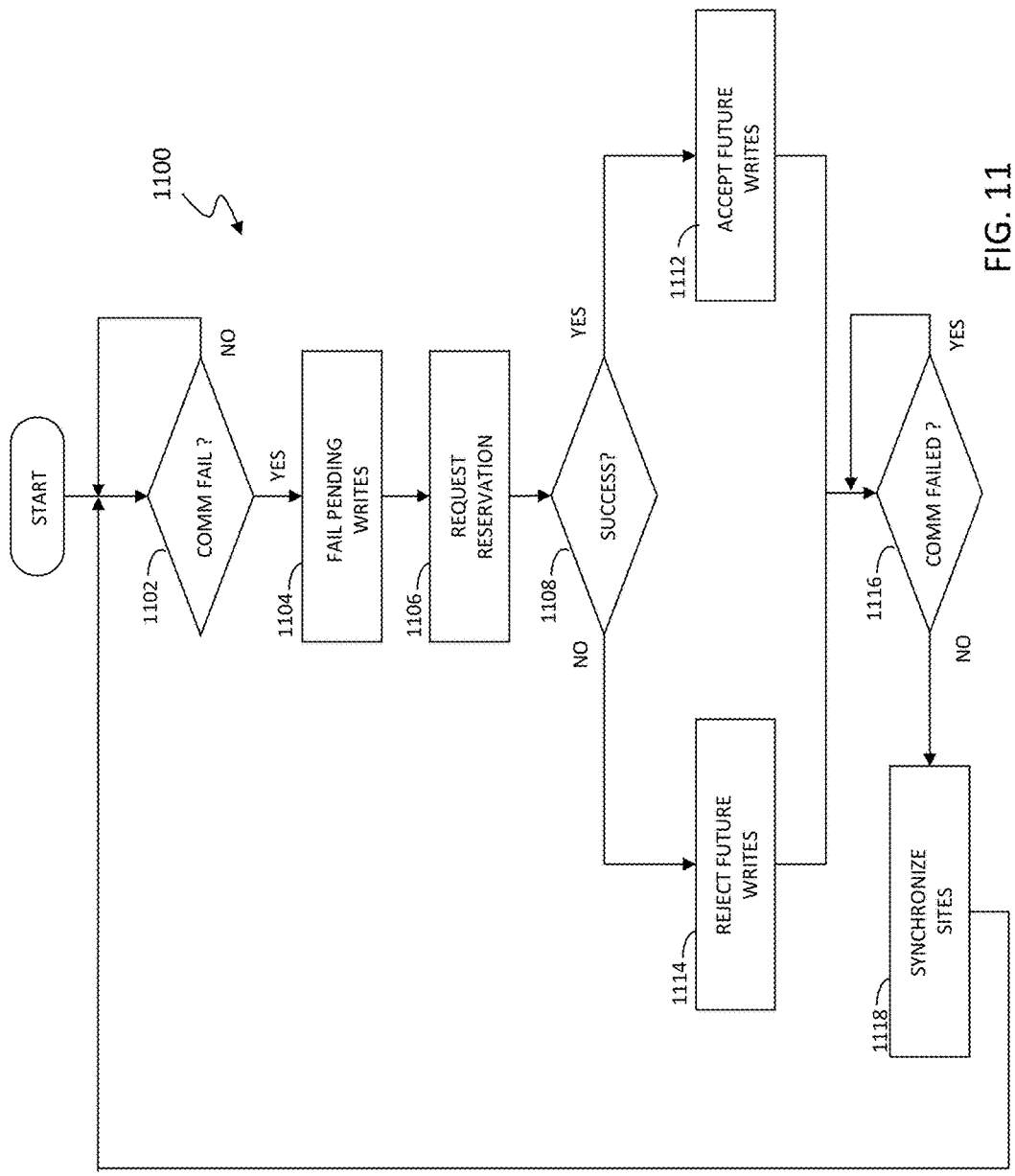
FIG. 11 is a flow diagram indicating processing performed by a site in connection with a a communication failure between sites according to an embodiment of the system described herein.

Referring to FIG. 11, a flow diagram 1100 illustrates processing performed by each of the sites 1002, 1004 in connection with monitoring and handling communication failures between the sites 1002, 1004. Processing begins at a first step 1102 where it is determined if communication between the sites 1002, 1004 has failed. If not, control transfers back to the step 1102. The step 1102 is essentially a polling step that waits to determine if communication between the sites 1002, 1004 has failed. That is, the remainder of the processing illustrated by the flow diagram 1100 is not performed unless and until communication between the sites 1002, 1004 fails.

If it is determined at the test step 1102 that communication between the sites 1002, 1004 has failed, then control transfers from the test step 1102 to a step 1104 where all pending I/O operations corresponding to I/O operations that have not been synchronized between the sites 1002, 1004 are failed back to a calling device (e.g., a host). For example, if a host writes particular data to the site 1002, but the site 1002 cannot transfer the particular data to the site 1004 for synchronization (because of the communication error), then the site 1002 fails the I/O operation(s) for the particular data back to the host. Following the step 1104 is a step 1106 where a reservation is requested from the witness 1006. Requesting the reservation at the step 1106 includes making a call to the witness 1006 to determine whether the calling one of sites 1002, 1004 should accept subsequent writes. Processing performed by the witness 1006 in connection with one of the sites 1002, 1004 requesting a reservation is discussed in more detail elsewhere herein.

Following the step 1106 is a test step 1108 where it is determined if the call at the step 1106 resulted in a reservation indicating that the calling one of the sites 1002, 1004 should accept subsequent writes. If so, then control transfers from the test step 1108 to a step 1112 where a flag is set to indicate that the calling one of the sites 1002, 1004 should accept subsequent write operations. Otherwise, if the call at the step 1106 did not result in a reservation, control transfers from the test step 1108 to a step 1114 where a flag is set to indicate that the calling one of the sites 1002, 1004 should not accept subsequent write operations. Following either the step 1112 or the step 1114 is a step 1116 where it is determined if communication between the sites 1002, 1004 is still in a failure state. If so, then control transfers back to the step 1116, to continue waiting for communication between the sites 1002, 1004 to return. Otherwise, if communication between the sites 1002, 1004 is no longer in a failure state, then control transfers from the test step 1116 to a step 1118 where data between the sites 1002, 1004 is synchronized. Following the step 1118, control transfers back to the step 1102, discussed above, for another iteration.

Figure 12:
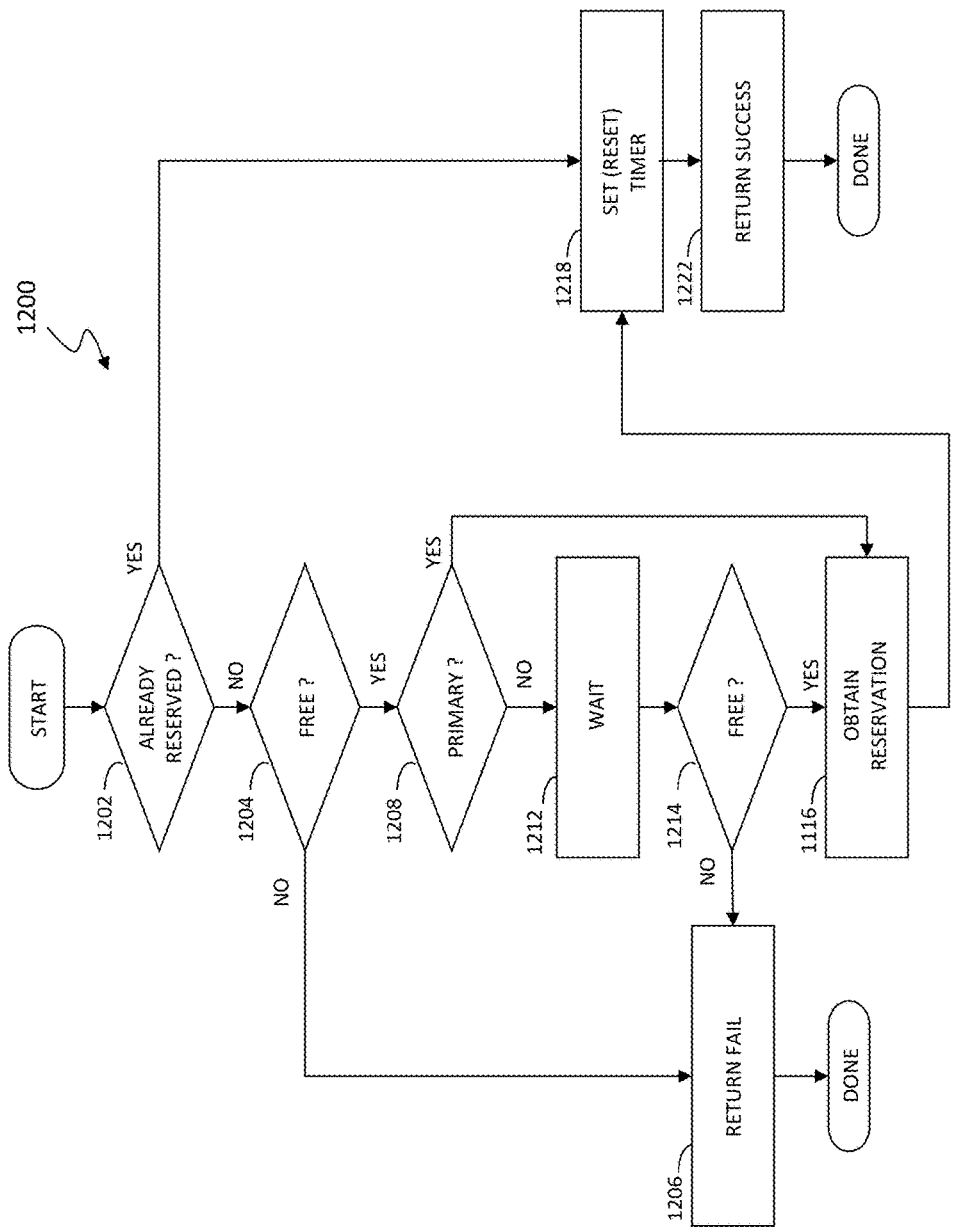
FIG. 12 is a flow diagram indicating processing performed by a witness in connection with a request to write data by a site according to an embodiment of the system described herein.

Referring to FIG. 12, a flow diagram 1200 illustrates steps performed by the witness 1006 in connection with servicing requests from each of the sites 1002, 1004 for a reservation (discussed above in connection with the step 1106). Processing begins at a first test step 1202 where it is determined if the requesting site already has a reservation (allowing the requesting site to accept writes). In some cases, it is possible for a site to repeatedly request a reservation even if the site already has a reservation. If it is determined at the test step 1202 that the requesting site does not already have a reservation, then control transfers from the test step 1202 to a test step 1204 where it is determined if the reservation is available. If not (i.e., the reservation was previously provided to another site), then control transfers from the test step 1204 to a step 1206 where a result to be provided back to the requesting site is set to a value indicating that the reservation request operation has failed. Following the step 1206, processing is complete.

If it is determined at the test step 1204 that the reservation is free, then control transfers from the test step 1204 to a test step 1208 where it is determined if the request is from a primary site. In an embodiment herein, one of the sites 1002, 1004 is deemed a primary site and is given precedence for reservation requests so that, if the primary site and another site request a reservation at approximately the same time, in most cases the primary site obtains the reservation. If it is determined at the test step 1208 that the requesting site is not a primary site, then control transfers from the step 1208 to a step 1212 where the system waits a predetermined amount of time. In an embodiment herein, the predetermined amount of time is five seconds, although more or less time is also possible. Waiting at the step 1212 in connection with a request by a non-primary site allows a primary site to possibly obtain the reservation during the wait period. Thus, performing the wait at the step 1212 give precedence to a primary site. Following the step 1212 is a test step 1214 where it is determined if the reservation is still free since it is possible for a primary site to have obtained the reservation during the wait at the step 1212. If the reservation is not free, then control transfers from the test step 1214 to the step 1206, discussed above, where a result to be provided back to the requesting site is set to a value indicating that the reservation request operation has failed. Following the step 1206, processing is complete.

If it is determined at the test step 1214 that the reservation is free, then control transfers from the test step 1214 to a step 1216 where the reservation is obtained. Note that the step 1216 is also reached directly from the step 1208 if the requesting site is a primary site (i.e., the step 1212 corresponding to waiting, discussed above, is skipped). Following the step 1216 is a step 1218 where a timer is set (reset) to a predetermined value. The timer is used to automatically release the reservation if the site does not request the reservation again during a predetermined amount of time indicated by the timer. In an embodiment herein, the timer is set to thirty seconds, although other values could be used. Note that the step 1218 is reached directly from the step 1202 if the requesting site had previously obtained the reservation. Thus, a site requesting a reservation that the site has already reserved causes the timer to be reset. Following the step 1218 is a step 1222 where a result to be provided back to the requesting site is set to a value indicating that the reservation request has succeeded. Following the step 1222, processing is complete.

Figure 13:
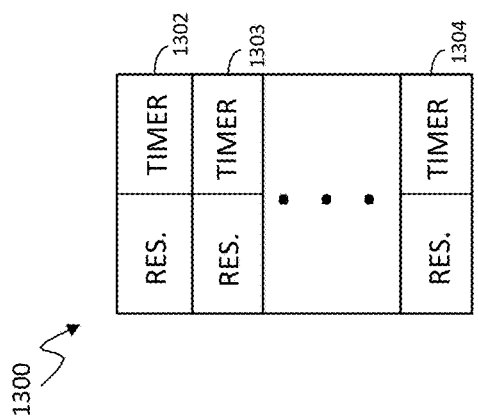
FIG. 13 shows a table used by a witness according to an embodiment of the system described herein.

Referring to FIG. 13, a table 1300 is maintained by the witness 1006 in connection with determining a reservation state for groups of sites that synchronize data. The table 1300 includes a plurality of entries 1302-1304, each of which corresponds to a group of sites that synchronize data. For example, one of the entries 1302-1304 may correspond to the two sites 1002, 1004. Each of the entries 1302-1304 includes a reservation field and a timer field. The reservation field indicates if a corresponding reservation is free or, if not free, which of the sites has the reservation. The timer field corresponds to the timer set at the step 1218 of the flow diagram 1200 of FIG. 12, discussed above. In an embodiment herein, the timer is set to a particular value at the step 1218 and then, periodically, is decremented by the system, which also frees the corresponding reservation when the timer reaches zero.

Figure 14:
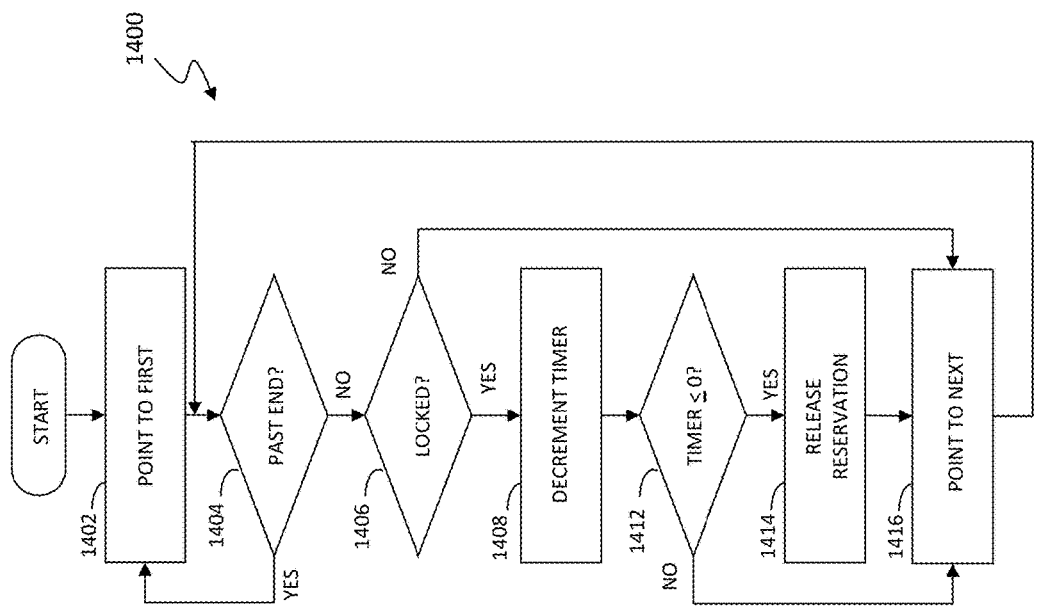
FIG. 14 is a flow diagram indicating processing performed by a witness in connection with decrementing timers according to an embodiment of the system described herein.

Referring to FIG. 14, a flow diagram 1400 illustrates processing performed by the witness 1006 in connection with decrementing timers and, in some instances, automatically releasing reservations. Processing begins at a first step 1402 to initialize a pointer that iterates though all of the groups of sites managed by the witness 1006 (i.e., all of the entries 1302-1304 in the table 1300, discussed above). Following the step 1402 is a test step 1404 where it is determined if the pointer points past the end of the list of groups (i.e., all of the entries 1302-1304 in the table 1300 have been processed). If so, then control transfers from the test step 1404 back to the step 1402, discussed above, to begin another iteration. Otherwise, control transfers from the test step 1404 to a test step 1406 where it is determined if the reservation indicated by the pointer is not free (i.e., if the corresponding one of the entries 1302-1304 indicates that a particular site from a group of sites has the reservation). If so, then control transfers from the test step 1406 to a step 1408 where the corresponding timer is decremented to indicate a passage of time. For example, if the timer is provided in units of seconds and the process illustrated by the flow diagram 1400 runs once every two seconds, then the timer is decremented by two at the step 1408.

Following the step 1408 is a test step 1412 where it is determined if the timer is less than or equal to zero, indicating that the timer has expired. If so, then control transfers from the test step 1412 to a step 1414 where the corresponding reservation is freed. Following the step 1414 is a step 1416, where the pointer is incremented. Note that the step 1416 is also reached from the test step 1412 if the timer is not less than or equal to zero and is reached from the test step 1406 if the reservation for the entry being processed is already free. Following the step 1416, control transfers back to the step 1404, discussed above, to process a next entry indicated by the pointer. Note that the system described herein provides a mechanism where the witness 1006 does not need to maintain complex state information for each of the groups of sites that synchronize data. Instead, the witness 1006 maintains the table 1300 which indicates, for each reservation, whether the reservation is free and, if not, which of the sites of a group of sites (e.g., which of the 1002, 1004) has the reservation. The use of the timer mechanism to clear reservations alleviates the system of needing to provide an explicit clearing mechanism initiated by the sites 1002, 1004 that would entail additional complexity/states.

Referring to FIG. 15, a diagram 1500 illustrates an alternative configuration where the sites 1002, 1004 may use one of a plurality of possible witnesses 1006a-1006c. The sites 1002, 1004 a priori agree on which of the witnesses 1006a-1006c will be used and then periodically renegotiate to either choose a new one of the witnesses 1006a-1006c or use a same one of the witnesses 1006a-1006c from a previous iteration. This is explained in more detail elsewhere herein. Note that, if the sites are using a particular one of the witnesses 1006a-1006c that stops working for some reason, the sites 1002, 1004 will choose a new (operative) one of the witnesses 1006a-1006c when the sites periodically renegotiate a choice of one of the witnesses 1006a-1006c.

Figure 16:
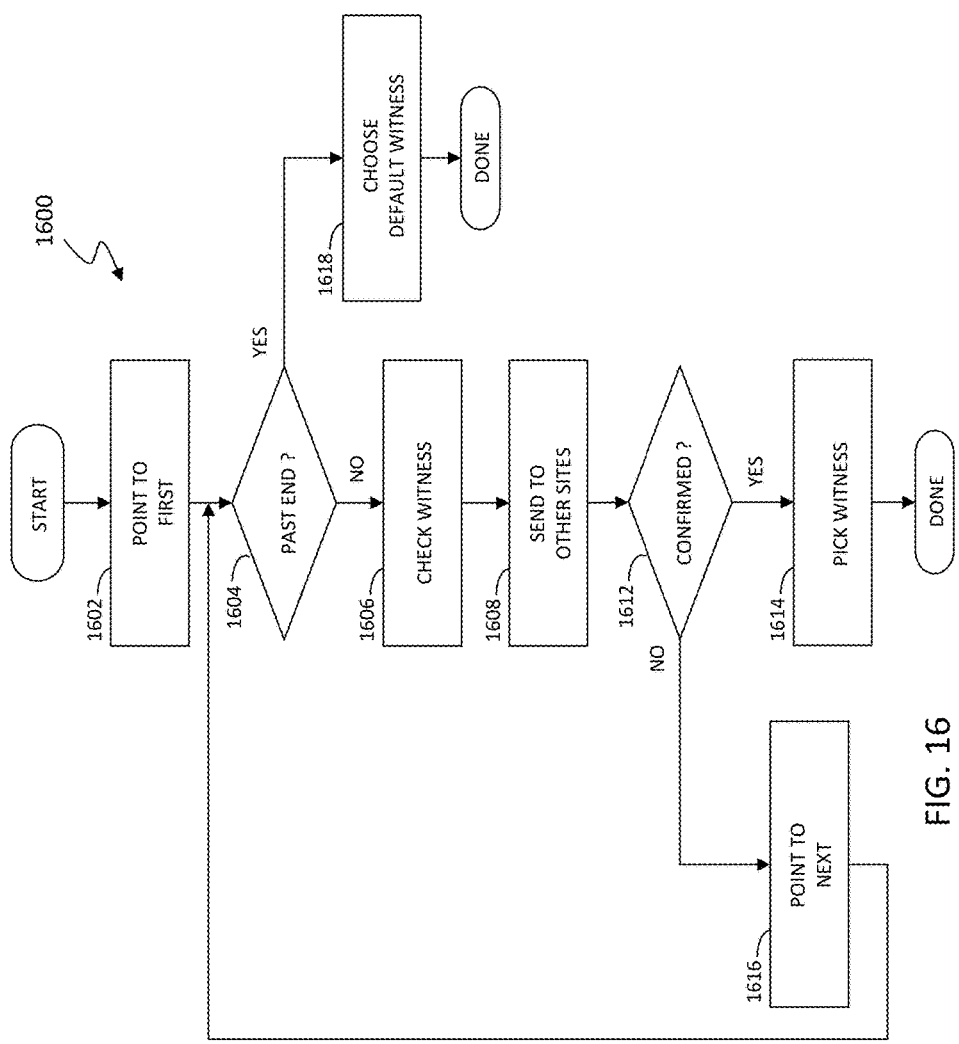
FIG. 16 is a flow diagram indicating processing performed in connection with negotiating a witness according to an embodiment of the system described herein.

Referring to FIG. 16, a flow diagram 1600 illustrates periodically renegotiating a witness for the sites 1002, 1004. In an embodiment herein, renegotiation may occur every ten seconds, but of course longer or shorter periods are also possible. In addition, a primary one of the sites 1002, 1004 may handle the renegotiation by iterating through the witnesses 1006a-1006c. Thus, the processing illustrated by the flow diagram 1600 may be performed by the primary one of the sites 1002, 1004.

Processing for the flow diagram 1600 begins at a first step 1602 where an iteration pointer that iterates through all of the witnesses 1006a-1006c is set to point to the first one of the witnesses 1006a-1006c. Following the step 1602 is a test step 1604 where it is determined if the iteration pointer points past an end of a list of the witnesses 1006a-1006c (i.e., all of the possible witnesses have been reviewed). If not, then control transfers from the test step 1604 to a step 1606 where the one of the witnesses 1006a-1006c indicated by the iteration pointer is examined (i.e., to confirm that the witness is operative, available to act as a witness, etc.). Following the step 1606 is a step 1608 where an identifier for the potential witness is sent to the other (non-primary) sites for confirmation by the other sites. The other sites may not be able to confirm a potential witness for any number of reasons, including the possibility that one or more of the other sites cannot communicate with the prospective witness.

Following the step 1608 is a test step 1612 where it is determined if the other sites have confirmed the witness. If so, then control transfers from the test step 1612 to a step 1614 where the witness is set to be the one of the witnesses 1006a-1006c indicated by the iteration pointer. Following the step 1614, processing is complete. If it is determined at the test step 1612 that the other sites do not confirm the witness indicated by the iteration pointer, then control transfers from the test step 1612 to a step 1616 where the iteration pointer is incremented. Following the step 1616, control transfers back to the step 1604, discussed above, to test a next one of the witnesses 1006a-1006c. In an embodiment herein, if all of the witnesses 1006a-1006c have been tested and no suitable witness has been found, then control transfers from the test step 1604 to a step 1618 where a default one of the witnesses 1006a-1006c is chosen by all of the sites. Following the step 1618, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of maintaining write consistency between at least two mirrored storage devices, comprising:
   receiving a write request for a particular block at a particular one of the storage devices;
   attempting to obtain a reservation for the particular block at the particular one of the storage devices;
   waiting for the particular block at the particular one of the storage devices to become available in response to not being able to successfully obtain the reservation;
   writing the particular block at the particular one of the storage devices in response to successfully obtaining the reservation;
   attempt to write the particular block at a remote one of the storage devices following writing the particular block at the particular one of the storage devices;
   determining if a retryable indicator is received in response to writing the particular block at a remote one of the storage devices failing;
   waiting a predetermined amount of time and releasing the reservation in response to writing the particular block at a remote one of the storage devices failing and receiving the retryable indicator;
   responding to the write request with a success indicator and releasing the reservation in response to writing the particular block at a remote one of the storage devices succeeding; and
   responding to the write request with a failure indicator and releasing the reservation in response to writing the particular block at a remote one of the storage devices failing and not receiving the retryable indicator.

2. A method, according to claim 1, wherein the predetermined amount of time is two hundred milliseconds.

3. A method, according to claim 1, wherein the remote one of the storage device returns the retryable indicator in response to the remote one of the storage device being deemed a primary storage device.

4. A method, according to claim 1, wherein the at least two mirrored storage devices are coupled to a switch.

5. A method, according to claim 4, wherein the switch is coupled to a plurality of host devices that access the at least two storage devices.

6. A method, according to claim 4, wherein the switch causes the at least two mirrored storage devices to appear as a single storage device.

7. A method, according to claim 1, wherein following waiting for the particular block at the particular one of the storage devices to become available in response to not being able to successfully obtain the reservation, the I/O times out and fails.

8. A method, according to claim 1, wherein the blocks are a fixed length of 512 bytes.

9. A non-transitory computer-readable medium containing software that maintains write consistency between at least two mirrored storage devices, the software comprising:
   executable code that receives a write request for a particular block at a particular one of the storage devices;
   executable code that attempts to obtain a reservation for the particular block at the particular one of the storage devices;
   executable code that waits for the particular block at the particular one of the storage devices to become available in response to not being able to successfully obtain the reservation;
   executable code that writes the particular block at the particular one of the storage devices in response to successfully obtaining the reservation;
   executable code that attempts to write the particular block at a remote one of the storage devices following writing the particular block at the particular one of the storage devices;
   executable code that determines if a retryable indicator is received in response to writing the particular block at a remote one of the storage devices failing;
   executable code that waits a predetermined amount of time and releases the reservation in response to writing the particular block at a remote one of the storage devices failing and receiving the retryable indicator;
   executable code that responds to the write request with a success indicator and releases the reservation in response to writing the particular block at a remote one of the storage devices succeeding; and
   executable code that responds to the write request with a failure indicator and releases the reservation in response to writing the particular block at a remote one of the storage devices failing and not receiving the retryable indicator.

10. A non-transitory computer-readable medium, according to claim 9, wherein the predetermined amount of time is two hundred milliseconds.

11. A non-transitory computer-readable medium, according to claim 9, wherein the remote one of the storage device returns the retryable indicator in response to the remote one of the storage device being deemed a primary storage device.

12. A non-transitory computer-readable medium, according to claim 9, wherein the at least two mirrored storage devices are coupled to a switch.

13. A non-transitory computer-readable medium, according to claim 12, wherein the switch is coupled to a plurality of host devices that access the at least two storage devices.

14. A non-transitory computer-readable medium, according to claim 12, wherein the switch causes the at least two mirrored storage devices to appear as a single storage device.

15. A non-transitory computer-readable medium, according to claim 9, wherein following waiting for the particular block at the particular one of the storage devices to become available in response to not being able to successfully obtain the reservation, the I/O times out and fails.

16. A non-transitory computer-readable medium, according to claim 9, wherein the blocks are a fixed length of 512 bytes.

\* \* \* \* \*